US008872626B2

(12) United States Patent
Haddy

(10) Patent No.: US 8,872,626 B2
(45) Date of Patent: Oct. 28, 2014

(54) DETECTION OF BURIED ASSETS USING CURRENT LOCATION AND KNOWN BUFFER ZONES

(71) Applicant: Alan Haddy, Naples, FL (US)

(72) Inventor: Alan Haddy, Naples, FL (US)

( * ) Notice: Subject to any disclaimer, the term of this patent is extended or adjusted under 35 U.S.C. 154(b) by 0 days.

(21) Appl. No.: 14/226,397

(22) Filed: Mar. 26, 2014

(65) Prior Publication Data

US 2014/0203911 A1 Jul. 24, 2014

Related U.S. Application Data

(63) Continuation-in-part of application No. 14/060,301, filed on Oct. 22, 2013, which is a continuation-in-part of application No. 13/745,846, filed on Jan. 20, 2013, which is a continuation-in-part of application No. 13/543,612, filed on Jul. 6, 2012, now Pat. No. 8,358,201.

(51) Int. Cl.
*G01V 3/12* (2006.01)
*G08C 17/02* (2006.01)

(52) U.S. Cl.
CPC . *G01V 3/12* (2013.01); *G08C 17/02* (2013.01)
USPC .......................................... 340/8.1; 702/130

(58) Field of Classification Search
CPC ....... G01B 11/14; G06Q 10/00; G08G 1/123; G01V 3/12
USPC ........... 340/8.1; 702/130; 705/7.11; 324/326; 307/147
See application file for complete search history.

(56) References Cited

U.S. PATENT DOCUMENTS

| 3,192,747 | A | 7/1965 | Etal |
| 7,311,526 | B2 | 12/2007 | Rohrbach |
| 7,517,222 | B2 | 4/2009 | Rohrbach |
| 8,435,042 | B2 | 5/2013 | Rohrbach |
| 8,612,271 | B2 | 12/2013 | Nielsen |
| 2009/0121933 | A1 | 5/2009 | Tucker |
| 2009/0167308 | A1 | 7/2009 | Lomes |
| 2010/0045517 | A1 | 2/2010 | Tucker |
| 2010/0211354 | A1 | 8/2010 | Park |
| 2011/0191058 | A1* | 8/2011 | Nielsen et al. ................ 702/130 |
| 2013/0065406 | A1 | 3/2013 | Rohrbach |

* cited by examiner

*Primary Examiner* — Steven Lim
*Assistant Examiner* — Kaleria Knox
(74) *Attorney, Agent, or Firm* — Mark Terry

(57) ABSTRACT

A method on a mobile computing device for locating a buried asset is provided. The method includes receiving a data structure that represents a two dimensional area comprising a buffer zone at an above-surface location, wherein the buffer zone corresponds to a particular buried asset sought by an operator of the device and iteratively executing the following steps: a) calculating an above-surface location of the device; b) determining whether the above-surface location of the device is located within the two dimensional area; c) if the above-surface location is not located within the two dimensional area, determining whether a locating function of a component coupled with the mobile computing device is enabled, and if so, disabling the locating function; d) if the above-surface location is located within the area, determining whether the locating function of the component is disabled, and if so, enabling the locating function.

20 Claims, 8 Drawing Sheets

DETECTION OF BURIED ASSETS USING CURRENT LOCATION AND KNOWN BUFFER ZONES

CROSS-REFERENCE TO RELATED APPLICATIONS

This patent application is a continuation in part of, and claims priority to, patent application Ser. No. 14/060,301 filed Oct. 22, 2013 and entitled "Detection of Incursion of Proposed Excavation Zones Into Buried Assets," which is a continuation in part of, and claims priority to, patent application Ser. No. 13/745,846 filed Jan. 20, 2013 and entitled "Storage and Recall of Buried Asset Data Over Communications Networks for Damage Avoidance and Mapping," which is a continuation in part of patent application Ser. No. 13/543,612 filed Jul. 6, 2012 and entitled "Storage and Recall of Buried Asset Data Over Communications Networks for Damage Avoidance and Mapping", now U.S. Pat. No. 8,358,201. The subject matter of patent application Ser. Nos. 14/060,301, 13/543,612 and 13/745,846 are hereby incorporated by reference in their entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the detection and identification of buried assets (i.e., underground utility lines) and, more specifically, to processes for improving the precision of detection of buried assets.

BACKGROUND

Utility lines, such as lines for telephones, electricity distribution, natural gas, cable television, fiber optics, Internet, traffic lights, street lights, storm drains, water mains, and wastewater pipes, are often located underground. Utility lines are referred to as "buried assets" herein. Consequently, before excavation occurs in an area, especially an urban area, an excavator is typically required to clear excavation activities with the proper authorities and service providers. The clearance procedure usually requires that the excavator contact a central authority (such as "One Call", "811" and "Call Before You Dig," which are well known in the art) which, in turn, sends a notification to the appropriate utility companies. Subsequently, each utility company must perform a buried asset detection procedure, which includes having a field technician visit the proposed excavation site, detecting the relevant buried assets and physically marking the position of the buried asset using temporary paint or flags. Usually, a technician visiting a proposed excavation site utilizes a device known as a conventional locator—a commercial, off-the-shelf, utility locator device that detects and identifies buried assets using radio frequency and/or magnetic sensors. Upon completion of this procedure by the appropriate utility companies, excavation can occur with the security that buried assets will not be damaged.

Utility companies are faced with increasing requests to locate and mark the position of their buried assets to avoid damage from third party excavators, contractors and underground horizontal boring operations. One of the main obstacles experienced by locate technicians involves the presence of multiple buried assets in close proximity A single buried asset emanates signals in a standard circular radiating pattern 510 shown in FIG. 5A. Conventional locator devices 530 perform well when encountering a single buried asset radiating the standard circular electromagnetic signal pattern 510 from under the ground 518. When multiple buried assets are present in close proximity, however, the buried assets emanate interference signals like pattern 520 shown in FIG. 5A. Conventional locator devices do not perform well when encountering multiple buried asset emanating the interference signal pattern 520. Situations involving interference signals such as shown in 520 require the services of a very experienced and skilled technician that can detect such a situation and make the appropriate adjustments to find the exact buried asset the technician is seeking. With experienced technicians in short supply, utility companies do not have the resources to attend to all such situations that are presented. Even for experienced and skilled technicians, finding a target buried asset when interference signals are encountered can be time-consuming or simply not possible, and can lead to errors and mis-locates. As such, this leads to increased costs for utility companies and service providers, as well as potential safety hazards to workers and the general public.

Therefore, a need exists for improvements over the prior art, and more particularly for more efficient methods and systems for detecting and locating multiple buried assets in close proximity

SUMMARY

A method on a mobile computing device communicatively connected to a communications network, the mobile computing device for locating electromagnetic signals radiating from a buried asset is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a method on a mobile computing device for locating electromagnetic signals radiating from a buried asset is provided that solves the above-described problems. The method includes receiving a first data structure that represents a two dimensional area comprising a buffer zone at an above-surface location, wherein the buffer zone corresponds to a particular buried asset sought by an operator of the mobile computing device and iteratively executing the following four steps: a) calculating a above-surface location of the mobile computing device; b) determining whether the above-surface location of the mobile computing device is located within the two dimensional area represented by the first data structure; c) if the above-surface location is not located within the two dimensional area, determining whether an electromagnetic locating function of a component communicatively coupled with the mobile computing device is enabled, and if so, disabling the electromagnetic locating function of the component; and d) if the above-surface location is located within the two dimensional area, determining whether the electromagnetic locating function of the component is disabled, and if so, enabling the electromagnetic locating function of the component.
}

In another embodiment, a computer system communicatively connected to a communications network, the computer system for locating a buried asset, is disclosed. The computer system includes a component communicatively coupled with the computer system, wherein the component comprises an electromagnetic locating function for locating buried assets, a network connection device for communicatively coupling the computer system to the communications network, a memory storage, and a processing unit coupled to the memory storage, the network connection device, and the component, when the processing unit is programmed for receiving, via the communications network, a first data structure that represents a two dimensional area comprising a buffer zone at an above-surface location, wherein the buffer zone corresponds to a particular buried asset sought by a technician operating the computer system, and iteratively executing the following four steps: a) calculating a above-surface location of the computer system; b) determining whether the above-surface location of the computer system is located within the two dimensional area represented by the first data structure; c) if the above-surface location is not located within the two dimensional area, determining whether the electromagnetic locating function of the component is enabled, and if so, disabling the electromagnetic locating function of the component; and d) if the above-surface location is located within the two dimensional area, determining whether the electromagnetic locating function of the component is disabled, and if so, enabling the electromagnetic locating function of the component.

BRIEF DESCRIPTION OF THE DRAWINGS

The accompanying drawings, which are incorporated in and constitute a part of this disclosure, illustrate various example embodiments. In the drawings.

DETAILED DESCRIPTION

Figure 1:
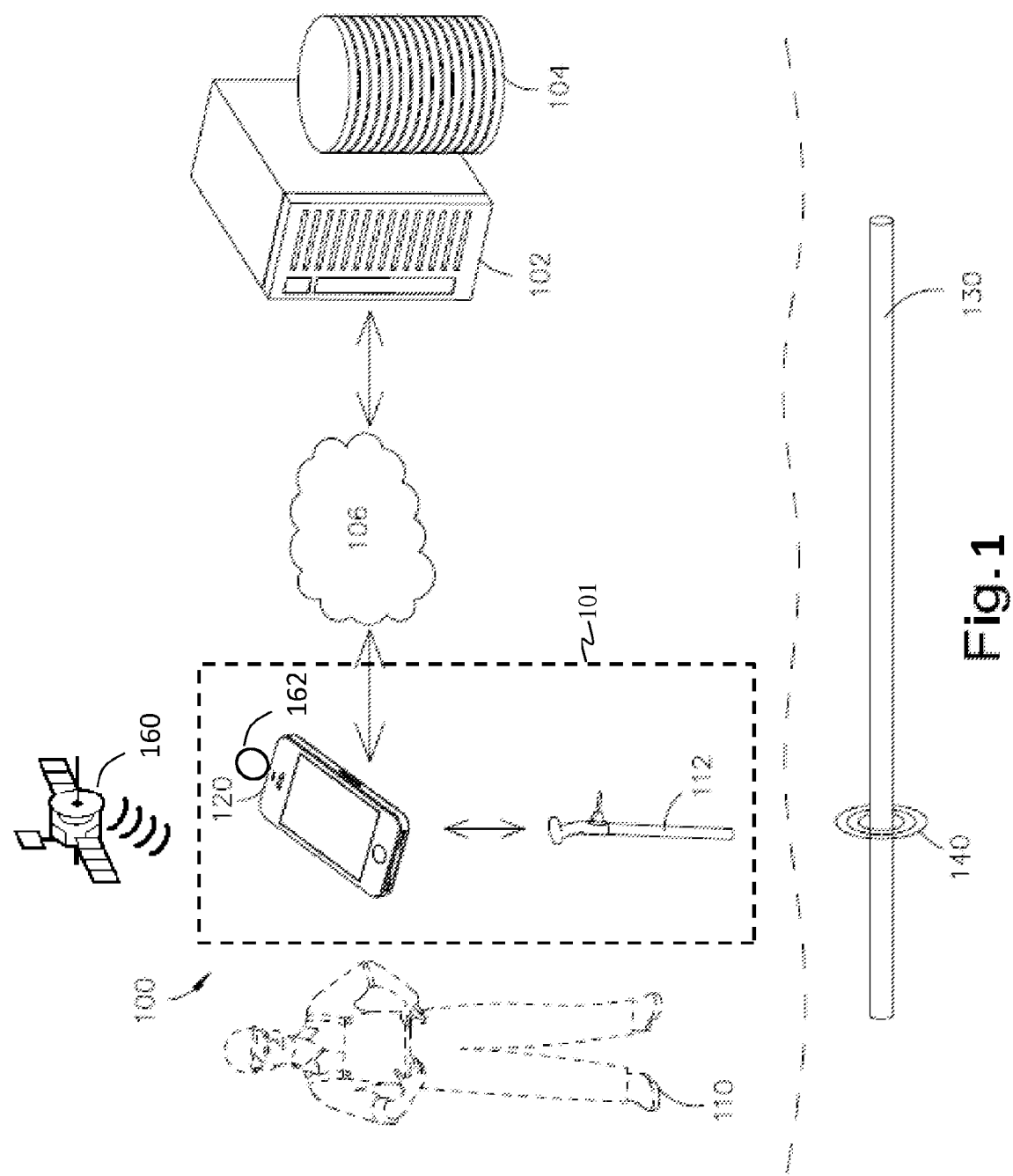
FIG. 1 is a diagram of an operating environment that supports a process for locating a buried asset using geographical location and known buffer zones, according to an example embodiment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

The present invention improves over the prior art by providing a more efficient, safe and precise way of locating a particular buried asset in situations where multiple buried assets are located in close proximity and emanating interference signals. The example embodiments leverage: 1) the wide availability of geographical location processors (such as GPS processors and other satellite or ground-based navigation systems) that provide geographical location information, as well as 2) previously stored two-dimensional or three-dimensional buffer zones around a target buried asset, to enable and disable the locating functions of an electromagnetic pipe or cable locator device according to the device's geographical location. By only allowing the locating functions of a pipe or cable locator device to be enabled when the locate technician is located within the buffer zone of the target buried asset, the example embodiments reduce or eliminate the possibility that the locate technician may accidentally misidentify interference signal readings from another buried asset as the target buried asset. This feature results in more safe, precise and accurate results by the field technician. The example embodiments further reduce the number of false identifications of a buried asset's location. This decreases the costs associated with buried asset detection in relation to the central authority.

FIG. 1 is a diagram of an operating environment 100 that supports a process on a server 102 for locating a target buried asset using geographical location information and known buffer zone information. The server 102 may be communicatively coupled with a communications network 106, according to an example embodiment. The environment 100 may comprise a mobile computing device120, which may communicate with server 102 via a communications network 106. Mobile computing device 120 may comprise a cellular telephone, smart phone or tablet computer. Device 120 may also comprise other computing devices such as desktop computers, laptops, and game consoles, for example. The mobile computing device 120 may be connected either wirelessly or in a wired or fiber optic form to the communications network 106. Communications network 106 may be a packet switched network, such as the Internet, or any local area network, wide area network, enterprise private network, cellular network, phone network, mobile communications network, or any combination of the above.

The environment 100 shows that mobile computing device 120 is operated by a technician or operator 110 (i.e., a field technician) and includes an antenna array 112, which may be communicatively coupled, either wirelessly or in a wired or fiber optic form, to the mobile computing device 120. As such, server 102, and devices 120 and 112 may each comprise a computing device 1100, described below in greater detail with respect to FIG. 6. FIG. 1 shows that antenna array 112 may be a component including one or more sensors that detect and measure radio frequency and/or electromagnetic signals 140 emanating from a buried asset 130. In one embodiment, array 112 includes all of the functions of a conventional locator device, which is well known in the art.

In another embodiment, the device 120 also calculates its current geographical position using an on-board processor or a connected processor and transmits it to the server 102 over network 106. In one embodiment, the device 120 calculates its current position using a satellite or ground based positioning system, such as a Global Positioning System (GPS) system, which is a navigation device that receives satellite or land based signals for the purpose of determining the device's current geographical position on Earth. A GPS receiver, and its accompanying processor, may calculate latitude, longitude and altitude information. In this embodiment, a radio frequency signal is received from a satellite (such as 160) or ground based transmitter comprising a time the signal was transmitted and a position of the transmitter. Subsequently, the device 120 calculates current geographical location data of the device 120 based on the signal, and transmits the current geographical location data to the server 102 via the communications network 106. In another embodiment, the device 120 calculates its current geographical location using alternative services, such as control plan locating, GSM localization, dead reckoning, or any combination of the aforementioned position services. In yet another embodiment, the device 120 also calculates its current compass heading (such as via the use of a compass application) and transmits this data to the server 102 over network 106.

In one embodiment, FIG. 1 shows that device 120 includes a peripheral 162, which may be a high accuracy or high precision satellite or ground based positioning system module that provides positional data of greater accuracy to device 120. In this embodiment, the functions related to calculating current geographical position are performed by device 162 instead of, or in conjunction with, device 120. In addition to satellite(s) 160, peripheral 162 may collect data from other sources, such as land-based position data providers that broadcast position data over radio frequency, or additional constellations of satellites. Alternatively, in lieu of device 120, array 112 and peripheral 162, the technician 110 may utilize a single, integrated locator device that detects and identifies buried assets using radio frequency and/or electromagnetic sensors, and which further performs the functions of device 120, array 112 and peripheral 162, as described herein. In this alternative, all of the functions of 120, 112, and 162 are provided by one, single, integrated device (indicated by 101 in FIG. 1) handled by technician 110.

Server 102 includes a software engine that delivers applications, data, program code and other information to networked device 120. The software engine of server 102 may perform other processes such as transferring multimedia data in a stream of packets that are interpreted and rendered by a software application as the packets arrive. FIG. 1 further shows that server 102 includes a database or repository 104, which may be a relational database comprising a Structured Query Language (SQL) database stored in a SQL server. Mobile computing device 120 may also include its own database, either locally or via the cloud. The database 104 may serve buried asset data, buffer zone data, as well as related information, which may be used by server 102 and mobile computing device 120.

Server 102, mobile computing device 120 and antenna array 112 may each include program logic comprising computer source code, scripting language code or interpreted language code that perform various functions of the present invention. In one embodiment, the aforementioned program logic may comprise program module 607 in FIG. 6. It should be noted that although FIG. 1 shows only one mobile computing device 120 and one server 102, the system of the present invention supports any number of servers and mobile computing devices connected via network 106. Also note that although server 102 is shown as a single and independent entity, in one embodiment, server 102 and its functionality can be realized in a centralized fashion in one computer system or in a distributed fashion wherein different elements are spread across several interconnected computer systems.

Environment 100 may be used when a mobile computing device 120 engages in buried asset detection activities that comprise reading, generating, and storing buried asset data. Various types of data may be stored in the database 104 of server 102 with relation to a buried asset that has been detected and located. For example, the database 104 may store one or more records for each buried asset, and each record may include one or more buried asset data points. A buried asset data point may include a current time, a textual map address, and location data or position data, such as latitude and longitude coordinates, geographical coordinates, an altitude coordinate, or the like. A buried asset data point may also include depth measurement data, electromagnetic signal measurement data (such as electrical current measurement data, resistance measurement data, impedance measurement data, electrical signal magnitude measurement data, electrical signal frequency measurement data, electrical signal voltage measurement data, etc.), direction data and orientation data.

A buried asset data point may also include a precision data value corresponding to any piece of information associated with a buried asset data point, such as the geographical coordinate or. A precision data value is a value that represents the quality or level of precision of a piece of information, such as a geographical coordinate. All sensors and devices that read physical quantities have a certain amount of measurement error or observational error. A precision data value represents the amount or magnitude of the measurement error or observational error of a sensor or device at one time. In one embodiment, a precision data value is a numerical value, such as a real number from 0 to 1.0 (with a variable number of decimal points) wherein zero represents perfect precision, 0.5 represents a precision that is 50% off from a true value, 0.75 represents a precision that is 75% off from a true value, etc. In another embodiment, a precision data value is an alphanumeric value (such as a word or other ASCII string) that corresponds (according to a lookup table or other correspondence table) to a predefined amount of precision. In another embodiment, a precision data value is any set of values that may be sorted according to ascending or descending value. Thus, in this embodiment, precision data values may have ascending and descending values.

In one embodiment, the precision data value is inversely proportional to the level of precision of quality of a piece of information, such as a geographical coordinate. Thus, when there is a large margin of error or a low confidence level in a piece of information, then the precision data value is high and the quality or level of precision of the information is low. Conversely, when there is a small margin of error or a high confidence level in a piece of information, then the precision data value is low and the quality or level of precision of the information is high.

With regard to geographical coordinates, HDOP, VDOP, PDOP, and TDOP values (Horizontal, Vertical, Positional and Time Dilution of Precision, respectively) are values well known in the art for representing the quality or level of precision of a geographical coordinate. Also with regard to geographical coordinates, values representing the quality or level of precision of a geographical coordinate may rely on whether a differential correction technique (such as differential GPS) was used in calculating the coordinate. The Differential Global Positioning System (DGPS) is an enhancement to Global Positioning System that provides improved location accuracy. DGPS uses a network of fixed, ground-based reference stations to broadcast the difference between the positions indicated by the satellite systems and the known fixed positions. As such, if DGPS was used to calculate a geographical coordinate, then the precision data value of the coordinate may reflect that fact. For example, the precision data value may indicate higher accuracy if DGPS was used.

Similarly, a buried asset data point may also include a precision data value corresponding to any piece of information associated with a buried asset data point, such as a current time, a textual map address, depth measurement data, electrical signal measurement data (such as electrical current measurement data, signal strength data, resistance measurement data, impedance measurement data, electrical signal magnitude measurement data, electrical signal frequency measurement data, electrical signal voltage measurement data, electromagnetic vector data, etc.), direction data (left or right indicators that direct the technician to the location of the buried asset), orientation data, and location data or position data, such as latitude and longitude coordinates, geographical coordinates, an altitude coordinate, or the like.

Figure 2:
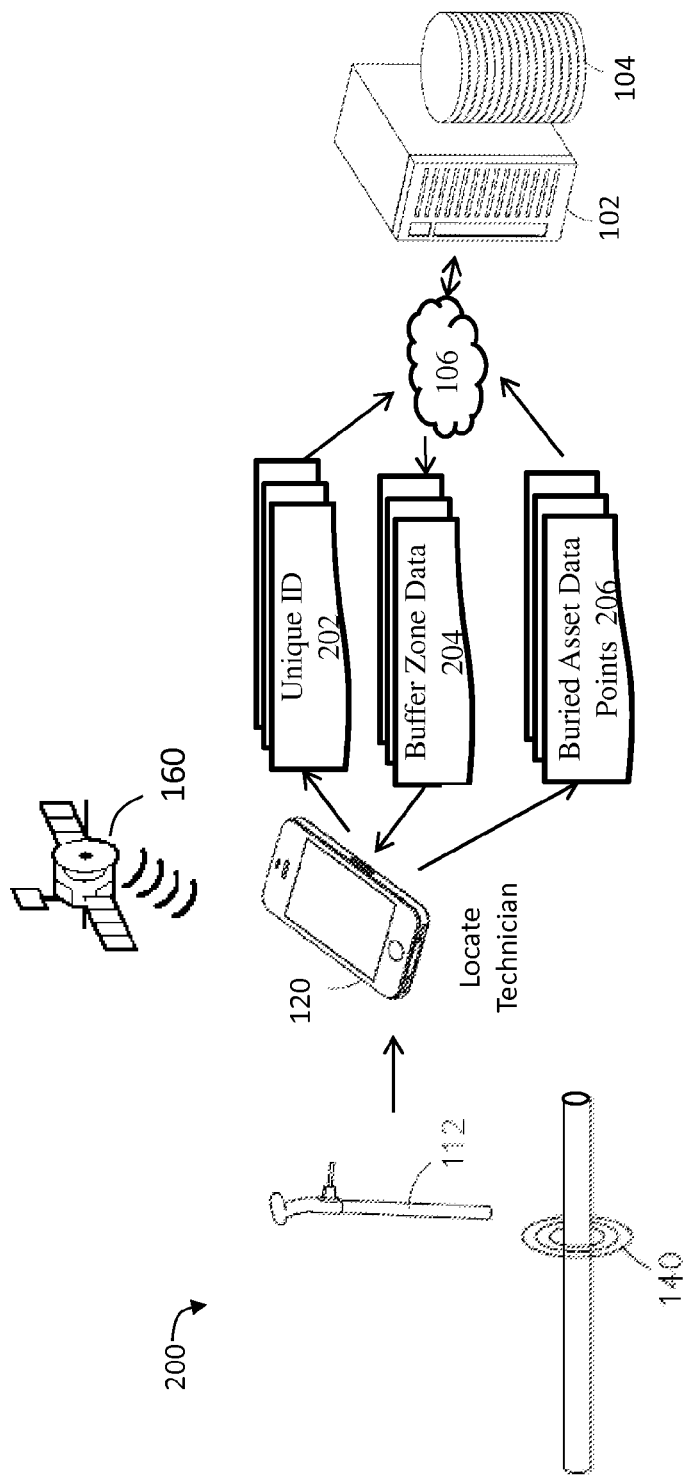
FIG. 2 is a diagram showing the data flow of the general process for locating a buried asset using geographical location and known buffer zones, according to an example embodiment.
Figure 3:
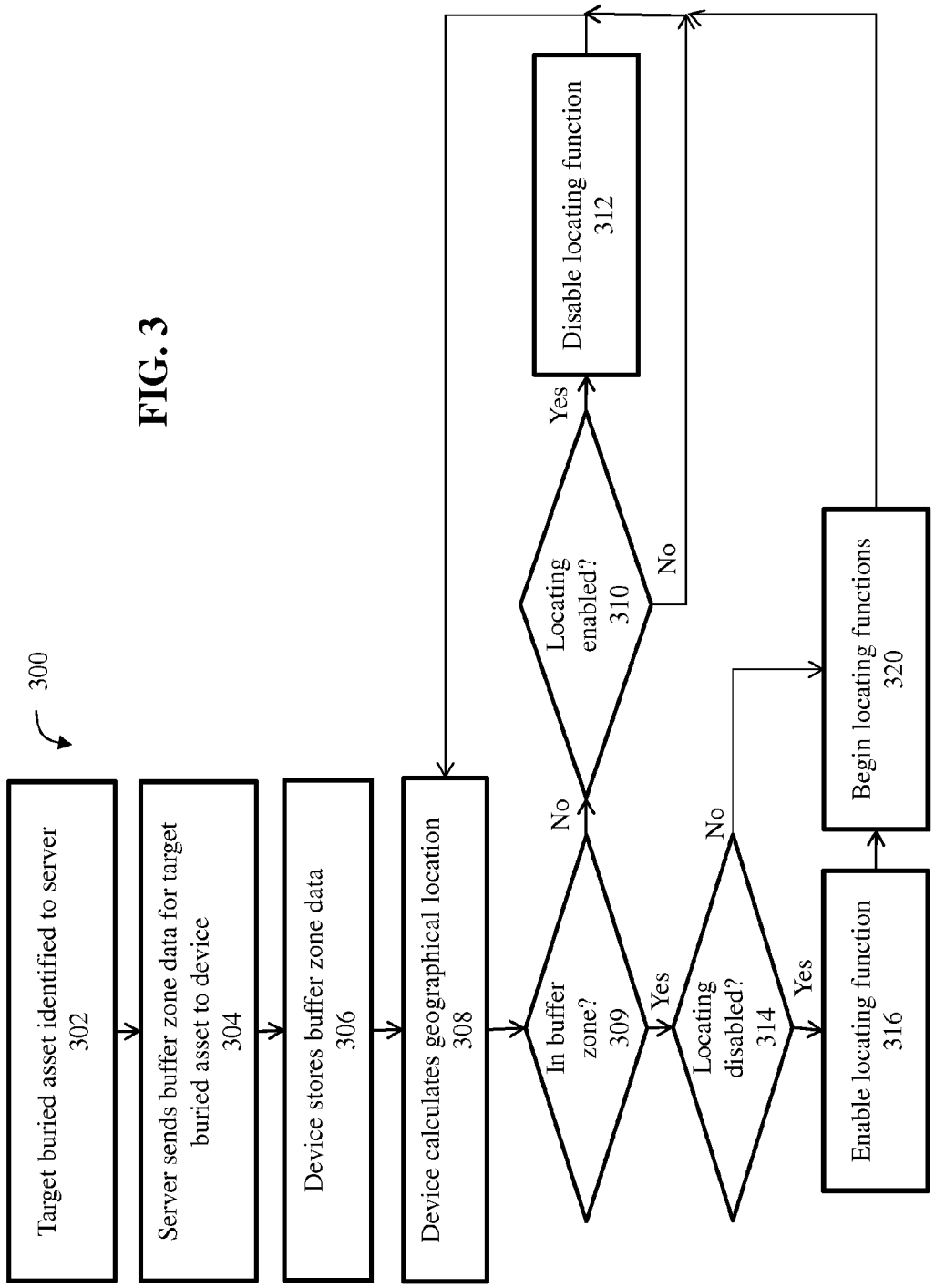
FIG. 3 is a flow chart showing the control flow of the process for locating a buried asset using geographical location and known buffer zones, according to an example embodiment.
Figure 5A:
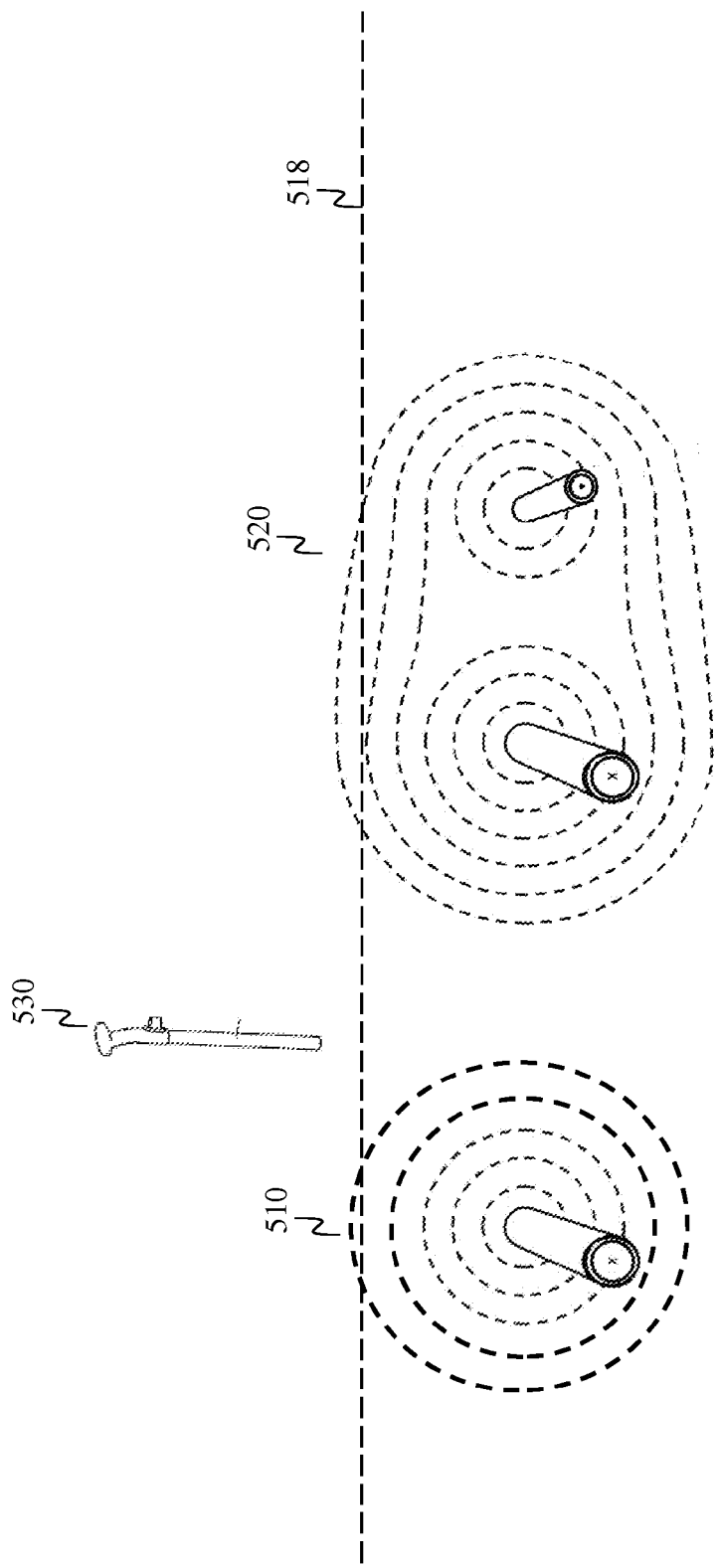
FIG. 5A is an illustration of radio frequency and/or electromagnetic radiating patterns emanating from buried assets.

FIG. 3 is a flow chart showing the control flow of the process 300 for locating a target buried asset using current geographical location information and known buffer zone information, according to an example embodiment. Process 300 describes the steps that occur when the locate technician 110 is seeking a particular target buried asset 552 (see FIG. 5B) that may be located within an area including multiple buried assets, giving rise to a situation where interference signals (such as shown in 520 in FIG. 5A and 520 in FIG. 5B) are present. The process 300 is described with reference to FIG. 1, FIG. 2, which shows the general data flow 200 of the process 300, and FIG. 5B, which shows the status of the locating functions of the device 530 when located inside and outside a buffer zone. Although the process 300 is described with reference to actions performed by device 120, any reference to device 120 may be interchangeable with a reference to device 101, as described above.

Process 300 starts with step 302 wherein a target buried asset 552 (see FIG. 5B), which is the buried asset the technician 110 is seeking, is identified to the server 102. In one embodiment, this step is accomplished by the reception of the server 102 of a work ticket specifying that a locate action must be performed at a particular location for a particular buried asset identified by unique identifier 202, type of buried asset, expected reading for buried asset, or the like. In another embodiment, this step is accomplished by the server 102 receiving a command from the technician 110, wherein the device 120 sends a unique identifier 202 for the target buried asset 552 to the server 102 via network 106. Step 302 may be performed while the technician 110 and device 120 are located on site in the vicinity of the target buried asset 552 or in another location. In another embodiment, step 302 may be performed automatically when the technician 110 and device 120 arrive at the vicinity of the target buried asset 552, the device 120 sends its current geographical location to the server 102 and the server 102 determines which buried assets are located at said location.

In step 304, the server 102 accesses a record associated with the unique identifier, wherein the record includes previously recorded buried asset data points for the target buried asset 552 or a previously calculated two-dimensional or three-dimensional buffer zone for the target buried asset 552. Also in step 304, the server sends to the device 120, via network 106, a data structure 204 including buried asset data points for the target buried asset 552 or a two-dimensional or three-dimensional buffer zone for the target buried asset 552. In step 306, the device 120 receives and stores the data structure. Optionally, if the device 120 receives only buried asset data points for the target buried asset 552 from server 102, then device 102 calculates a two-dimensional or three-dimensional buffer zone for the target buried asset 552.

Buffer zone data may be stored in the data structure 204 in a variety of ways. For example, a two-dimensional buffer zone may be represented in data structure 204 as a set of points that define the perimeter of the buffer zone area. In another example, a two-dimensional buffer zone may be represented in data structure 204 as a set of shapes (such as circles, squares, triangles, rectangles, trapezoids, etc.) that define the buffer zone area, wherein each shape is represented by a set of points that define its perimeter, its vertices, it center, its radius, etc.

In one embodiment, steps 304-306 may be performed by device 120 when device 120 interacts with server 102 via network 106 either wirelessly or in a wired manner. In another embodiment, steps 304-306 may be performed by device 120 when device 120 receives from server 102 the data 204 on a computer program product, such as a removable memory component that contains the data 204.

In step 308, the device 120, and/or component 162, calculates current geographical information for the device 120/array 112, using methods as disclosed above. In step 309, the server 102 determines whether the current geographical location of the device 120/array 112 is located within the buffer zone 550 (see FIG. 5B).

Figure 5B:
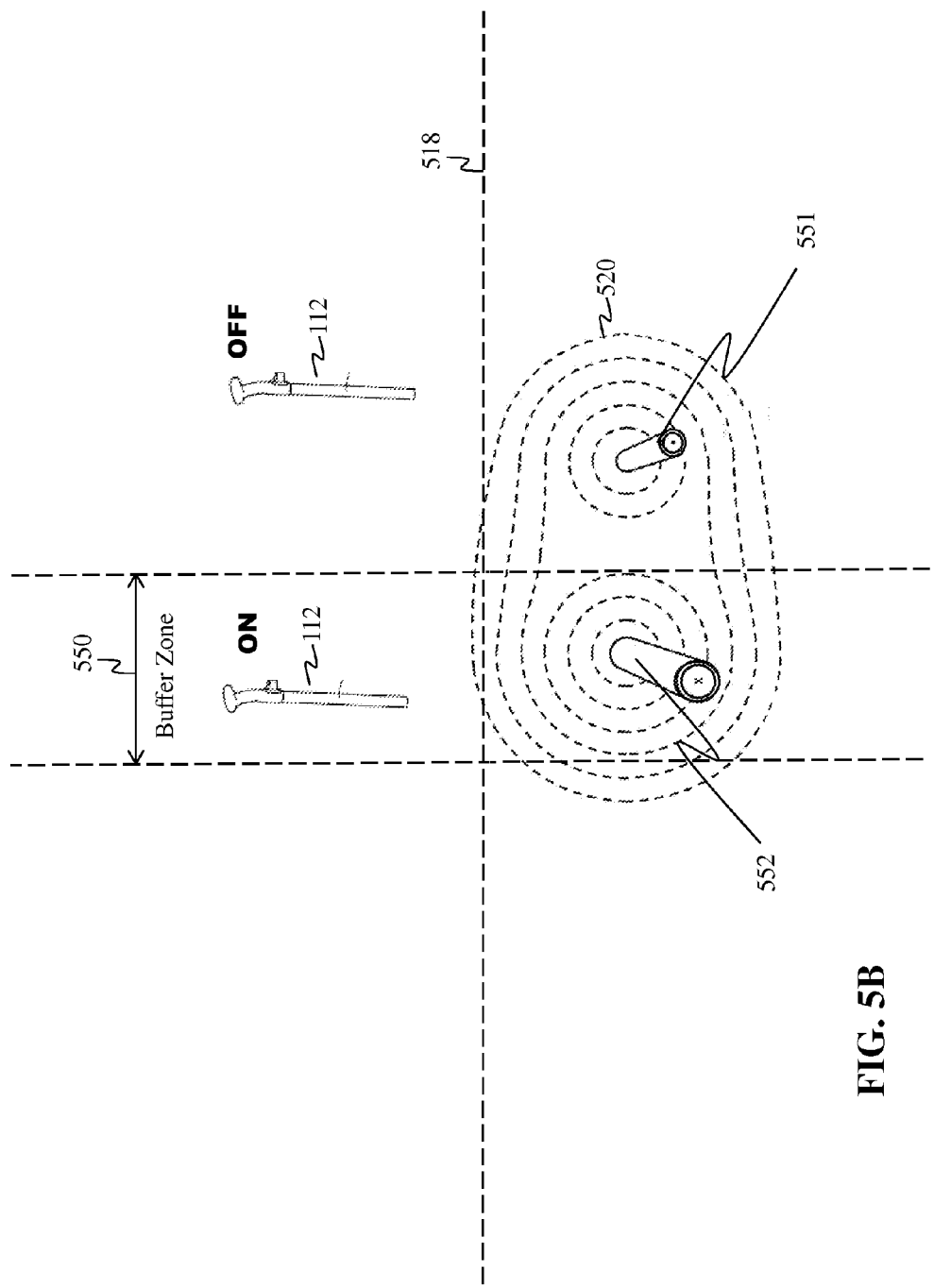
FIG. 5B is an illustration showing the general process for locating a buried asset using geographical location and known buffer zones, according to an example embodiment.

If the current geographical location of device 120/array 112 is not located within the buffer zone 550, then in step 310 the server 102 determines whether a locating function of array 112 is enabled, and if so, in step 312 the locating function of the array 112 is disabled. Thus, FIG. 5B shows that when array 112 is not located in the buffer zone 550, the locating function is turned off.

If the current geographical location of device 120/array 112 is located within the buffer zone 550, then in step 314 the server 102 determines whether the locating function of array 112 is disabled, and if so, in step 316 the locating function of array 112 is enabled. Thus, FIG. 5B shows that when array 112 is located in the buffer zone 550, the locating function is turned on.

Hence, the locating functions of array 112 are not turned on when the array 112 is above the incorrect buried asset 551, and therefore there cannot be an mis-identification of target buried asset 552, i.e., the technician cannot mistake buried asset 551 with the target buried asset 552 under the ground 518.

In step 320, the device 120 utilizes the antenna array 112 to read raw analog signals 520 emanating from the target buried asset 552. Based on the data it has received and calculated, device 120 calculates one or more buried asset data points 204 for the target buried asset 552. The device 120 uploads the buried asset data points 206 to the server 102 via the network 106.

As described above, the locating functions of array 112 may be enabled or disabled at various times. In one embodiment, the term "locating functions" or "electromagnetic locating functions" shall refer to those functions of the array 112 (or any conventional locator device) that performs electromagnetic signal sensing or detecting functions for the purpose of detecting and marking buried assets. In another embodiment, the locating functions of array 112, however, may include a bundle of various different sensing and measurement activities or functions. For example, the detecting and, separately, measuring of each of the individual data values for a buried asset data point (as described above, including current time, geographical coordinate, electromagnetic signal measurement. etc.) may comprise a separate function that may be turned on and off separately. Note that a function for measuring a metric (such as magnetic field) may be a completely separate and distinct function from one that detects or senses the presence of a magnetic field.

In one embodiment, the enablement/disablement of the locating functions of array 112 in steps 312, 316 may comprise enabling or disabling only a portion of the different sensing activities or functions of array 112. For example, in step 312, the electromagnetic signal detecting function may be disabled but the depth measurement function may be enabled. In another embodiment, the method 300 checks for depth measurement functions and enables and disables it accordingly. In this embodiment, in step 310, the server 102 determines whether the depth measurement functions of the component are enabled, and if so, in step 312, the depth measurement function is disabled (while other functions, like electromagnetic signal detection functions, remain in place). Also in this embodiment, in step 314, the server 102 determines whether the depth measurement functions of the component are disnabled, and if so, in step 316, the depth measurement function is enabled.

Figure 4A:
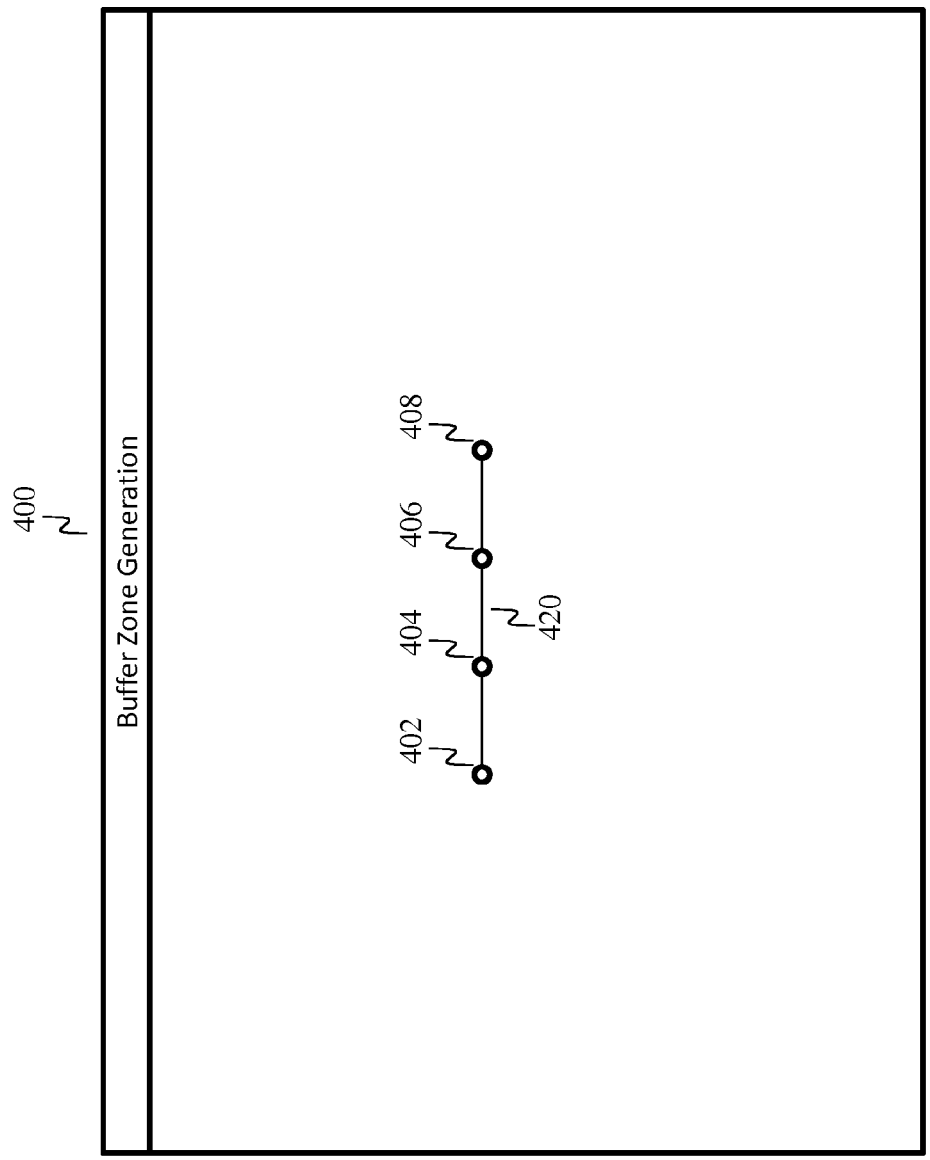
FIG. 4A is an illustration of a graphical user interface that shows buried asset data points connected via line segments, according to an example embodiment.
Figure 4B:
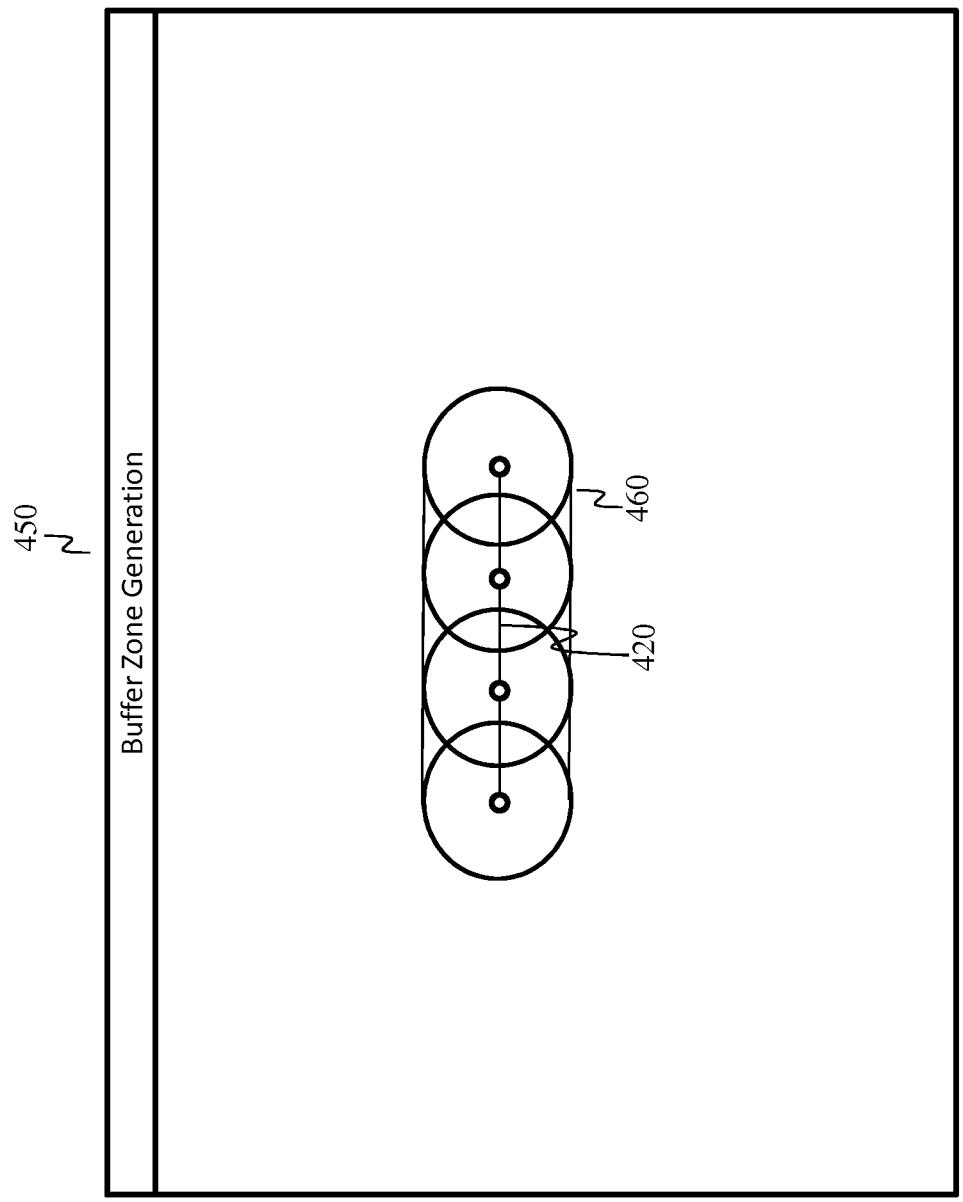
FIG. 4B is an illustration of a graphical user interface that shows buried asset data points surrounded by a two dimensional area, according to an example embodiment.

FIGS. 4A through 4B depict illustrations of graphical user interfaces (GUI) that show how a buffer zone is generated using buried asset data points, according to an example embodiment. See parent patent application Ser. No. 14/060,301 for a more detailed disclosure of how buffer zones are generated. In FIG. 4A, the GUI 400 shows that four buried asset data points 402, 404, 406, 408 are displayed according to their corresponding geographical coordinate data. The buried asset data points 402, 404, 406, 408 are connected via straight line segments to form a central line 420 that represents an approximation of the location of the buried asset in between the buried asset data points 402, 404, 406, 408.

GUI 450 of FIG. 4B shows that a two-dimensional area 460 comprising a buffer zone has been created around the buried asset data points 402, 404, 406, and 408. In GUI 450, the two-dimensional area was generated by defining a two-dimensional circle around each buried asset data point, wherein each circle is perpendicular to the central line 420, and connecting the tops of each circle, so as to create a two-dimensional area 460 that surrounds the central line 420. As discussed in more detail in parent patent application number 14/060,301, different types of buffer zones may be generated, such as three dimensional buffer zones comprising a volume, and the size and shape of buffer zones may vary according to the precision data values associated with the geographical location data (or any other data collected about a buried asset data point, such as depth measurement data) of each buried asset data point 402, 404, 406, and 408. Specifically, the size and shape of each circle surrounding a buried asset data point may vary according to the precision data value associated with the geographical location data associated with each buried asset data point 402, 404, 406, and 408 (or may vary according to a precision data value of any other data associated with a buried asset data point, such as depth measurement value, electromagnetic measurement data value, etc.)

Figure 6:
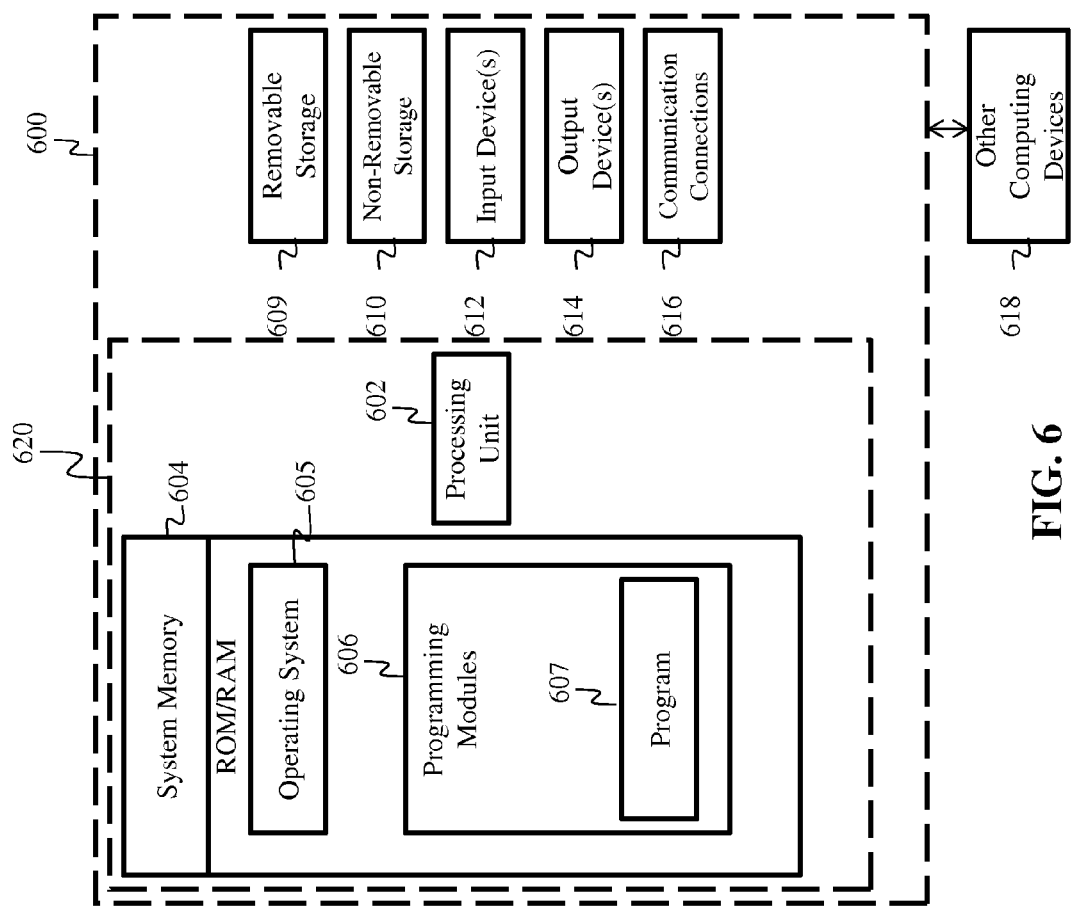
FIG. 6 is a block diagram of a system including a computing device, according to an example embodiment.

FIG. 6 is a block diagram of a system including an example computing device 600 and other computing devices. Consistent with the embodiments described herein, the aforementioned actions performed by server 102, device 120, and antenna array 112 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for system 100 and process 300, as described above. Process 300 may operate in other environments and are not limited to computing device 600.

With reference to FIG. 6, a system consistent with an embodiment of the invention may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of server 102, and device 120. Furthermore, embodiments of the invention may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. The aforementioned devices are only examples, and other devices may be added or substituted.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the process 900 as described above. The aforementioned processes are examples, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method on a mobile computing device for locating electromagnetic signals radiating from a buried asset, the method comprising:
    receiving a first data structure that represents a two dimensional area comprising a buffer zone at an above-surface location, wherein the buffer zone corresponds to a particular buried asset sought by an operator of the mobile computing device;
    iteratively executing the following four steps:
    a) calculating an above-surface location of the mobile computing device;
    b) determining whether the above-surface location of the mobile computing device is located within the two dimensional area represented by the first data structure;
    c) if the above-surface location is not located within the two dimensional area, determining whether an electromagnetic locating function of a component communicatively coupled with the mobile computing device is enabled, and if so, disabling the electromagnetic locating function of the component; and
    d) if the above-surface location is located within the two dimensional area, determining whether the electromagnetic locating function of the component is disabled, and if so, enabling the electromagnetic locating function of the component.

2. The method of claim 1, further comprising a step, before the first step of receiving a first data structure, comprising:
    transmitting, via a communications network communicatively coupled with the mobile computing device, a unique identifier for the particular buried asset sought by the operator of the mobile computing device.

3. The method of claim 2, wherein the step of calculating an above-surface location of the mobile device further comprises:
    executing a satellite navigation function on the mobile computing device to calculate the above-surface location of the mobile computing device.

4. The method of claim 3, wherein the step of determining whether an electromagnetic locating function of the component communicatively coupled with the mobile computing device is enabled further comprises:
    transmitting to the component a request for data regarding a status of the electromagnetic locating function of the component; and
    receiving a data packet from the component comprising a current status of the electromagnetic locating function of the component.

5. The method of claim 4, wherein the step of determining whether an electromagnetic locating function of the component communicatively coupled with the mobile computing device is disabled further comprises:
    transmitting to the component a request for data regarding a status of the electromagnetic locating function of the component; and
    receiving a data packet from the component comprising a current status of the electromagnetic locating function of the component.

6. The method of claim 5, wherein the step of disabling the electromagnetic locating function of the component further comprises:

disabling an electromagnetic signal measurement function of the component, while allowing other locating functions of the component to remain enabled.

7. The method of claim 6, further comprising a step, after the step of determining whether the electromagnetic locating function of the component is disabled, comprising:
 determining that a predefined period of time has passed.

8. A method on a server communicatively connected to a communications network, the server for aiding a communicatively connected mobile computing device in locating electromagnetic signals radiating from a buried asset, the method comprising:
 accessing in a connected database a first data structure that represents a two dimensional area comprising a buffer zone at an above-surface location, wherein the buffer zone corresponds to a particular buried asset sought by an operator of the mobile computing device;
 iteratively executing the following four steps:
 a) receiving from the mobile computing device, via the communications network, an above-surface location of the mobile computing device;
 b) determining whether the above-surface location of the mobile computing device is located within the two dimensional area represented by the first data structure;
 c) if the above-surface location is not located within the two dimensional area, determining whether a depth measurement function of a component communicatively coupled with the mobile computing device is enabled, and if so, transmitting to the mobile computing device, via the communications network, a command for disabling the depth measurement function of the component; and
 d) if the above-surface location is located within the two dimensional area, determining whether the depth measurement function of the component is disabled, and if so, transmitting to the mobile computing device, via the communications network, a command for enabling the depth measurement function of the component.

9. The method of claim 8, further comprising a step, before the first step of accessing a first data structure, comprising:
 receiving from the mobile computing device, via the communications network, a unique identifier for the particular buried asset sought by the operator of the mobile computing device.

10. The method of claim 9, wherein the step of determining whether a depth measurement function of the component communicatively coupled with the mobile computing device is enabled further comprises:
 transmitting to the mobile computing device, via the communications network, a request for data regarding a status of the depth measurement function of the component; and
 receiving a data packet from the mobile computing device, via the communications network, the data packet comprising a current status of the depth measurement function of the component.

11. The method of claim 10, wherein the step of determining whether a depth measurement function of the component communicatively coupled with the mobile computing device is disabled further comprises:
 transmitting to the mobile computing device, via the communications network, a request for data regarding the status of the depth measurement function of the component; and
 receiving a data packet from the mobile computing device, via the communications network, the data packet comprising a current status of the depth measurement function of the component.

12. The method of claim 11, wherein the command for disabling the depth measurement function of the component further comprises:
 a command for disabling a depth measurement function of the component, while allowing other locating functions of the component to remain enabled.

13. The method of claim 11, further comprising a step, after the step of determining whether the depth measurement function of the component is disabled, comprising:
 determining that a predefined period of time has passed.

14. A computer system communicatively connected to a communications network, the computer system for locating electromagnetic signals radiating from a buried asset, the computer system comprising:
 a component communicatively coupled with the computer system, wherein the component comprises an electromagnetic locating function for locating buried assets;
 a network connection device for communicatively coupling the computer system to the communications network;
 a memory storage; and
 a processing unit coupled to the memory storage, the network connection device, and the component, when the processing unit is programmed for:
 receiving, via the communications network, a first data structure that represents a two dimensional area comprising a buffer zone at an above-surface location, wherein the buffer zone corresponds to a particular buried asset sought by an operator of the computer system; and
 iteratively executing the following four steps:
 a) calculating an above-surface location of the computer system;
 b) determining whether the above-surface location of the computer system is located within the two dimensional area represented by the first data structure;
 c) if the above-surface location is not located within the two dimensional area, determining whether the electromagnetic locating function of the component is enabled, and if so, disabling the electromagnetic locating function of the component; and
 d) if the above-surface location is located within the two dimensional area, determining whether the electromagnetic locating function of the component is disabled, and if so, enabling the electromagnetic locating function of the component.

15. The computer system of claim 14, wherein the processor is further configured for executing a step, before the first step of receiving a first data structure, comprising:
 transmitting, via the communications network, a unique identifier for the particular buried asset sought by the operator of the mobile computing device.

16. The computer system of claim 15, further comprising a processor for executing a satellite navigation function to calculate the above-surface location of the computer system.

17. The computer system of claim 16, wherein the step of determining whether an electromagnetic locating function of the component is enabled further comprises:
 transmitting to the component a request for data regarding a status of the electromagnetic locating function of the component; and receiving a data packet from the component comprising a current status of the electromagnetic locating function of the component.

18. The computer system of claim 17, wherein the step of determining whether an electromagnetic locating function of the component is disabled further comprises:
    transmitting to the component a request for data regarding a status of the electromagnetic locating function of the component; and
    receiving a data packet from the component comprising a current status of the electromagnetic locating function of the component.

19. The computer system of claim 18, wherein the step of disabling the electromagnetic locating function of the component further comprises:
    disabling an electromagnetic signal measurement function of the component, while allowing other locating functions of the component to remain enabled.

20. The computer system of claim 19, further comprising a step, after the step of determining whether the electromagnetic locating function of the component is disabled, comprising:
    determining that a predefined period of time has passed.

* * * * *